United States Patent Office 2,811,673
Patented Oct. 29, 1957

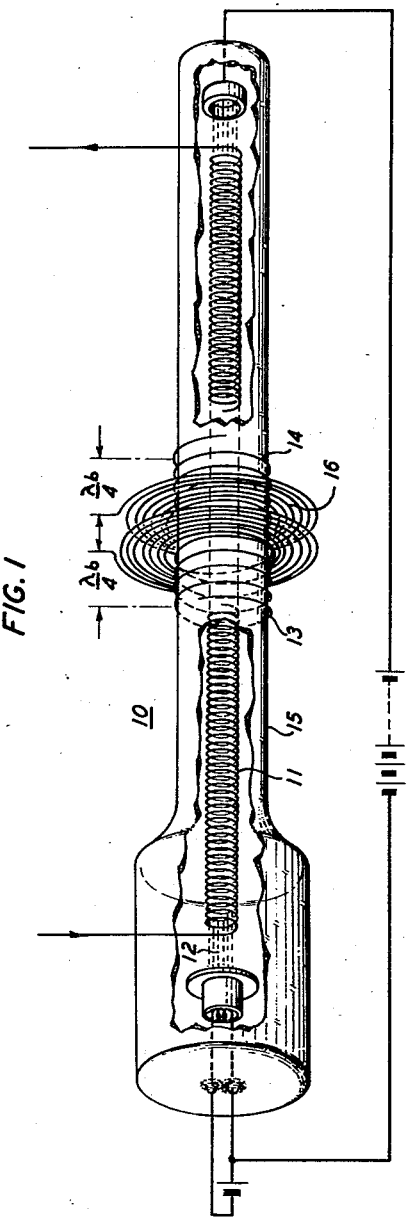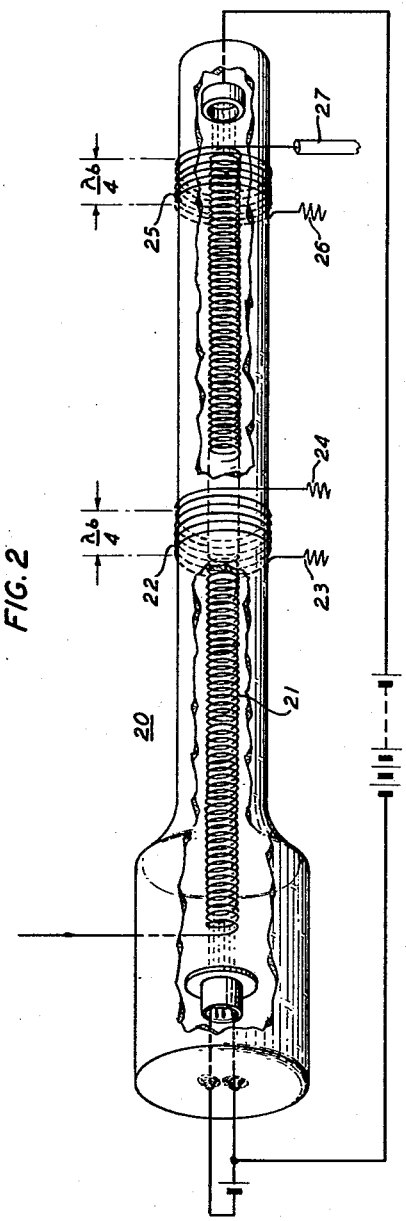

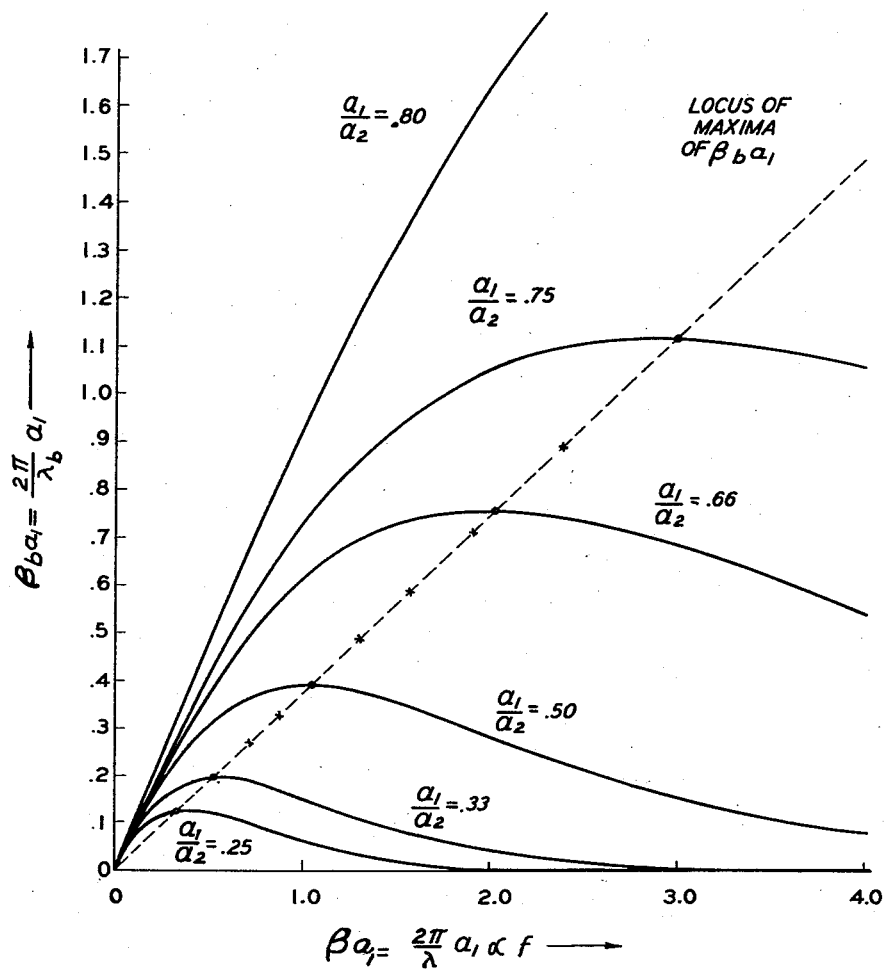

2,811,673
TRAVELING WAVE TUBE

Rudolf Kompfner, Far Hills, N. J., assignor to Bell Telephone Laboratories, Incorporated, New York, N. Y., a corporation of New York Application May 14, 1953, Serial No. 355,028

20 Claims. (Cl. 315—39.3)

This invention relates to coupled helices and more particularly it relates to the incorporation of such helices in traveling wave tubes.

An object of this invention is to provide an improved means for inserting attenuation into the wave propagating circuit of a traveling wave tube.

Amplification in a traveling wave tube may be obtained by propagating an electromagnetic wave along a slow wave circuit which is in coupling relation to an electron stream so that the wave may then extract energy from the electrons. In what is probably the most common type of traveling wave tube, a wave is conducted along a helix coaxial with an electron stream so that the axial component of the wave travels in the direction of electron flow at substantially the same velocity as the electrons. There may exist in this kind of tube, however, in addition to the forward wave, backward traveling waves which are capable of returning sufficient energy to the input of the circuit to sustain oscillations. Because these oscillations reduce tube efficiency and produce other bad effects it is frequently very desirable to prevent their occurrence and to this end it is customary to introduce loss along the helix whereby any backward traveling wave which may be present is reduced in amplitude below that necessary to produce oscillations. Previous to this invention, various ways, such as coatings of resistive material in the vicinity of the helix, have been developed to provide this loss, but so far as is known none of them has been able to provide uniform loss over a broad frequency band while at the same time permitting external adjustment of the amount of loss or its location along the helix. The present invention through the use of coupled helices is designed to provide these advantages.

In accordance with the present invention and in one embodiment thereof, the wave propagating helix of a helical traveling wave tube is coupled to a concentric surrounding helix so that unwanted wave energy may be extracted from the tube. This energy, which might otherwise cause spurious oscillations in the tube, is then dissipated in a resistance connected to the outer helix. Moreover, by making the diameter and pitch of this helix in particular ratios, respectively, to the diameter and pitch of the inner helix, the efficiency and band width for the tube may be improved.

A more complete understanding of the nature of this invention, however, will best be gained from a study of the following detailed description given in connection with the accompanying drawings in which:

Fig. 1 is a side view of a helical traveling wave tube having external concentric helices energy coupled to the wave propagating helix;

Fig. 2 shows a structure similar to that in Fig. 1 in which the wave propagating helix is coupled to one external helix having a resistance termination at each end, and to a second external helix which forms a part of the output circuit; and Fig. 3 is a plot of the phase constant $\beta_b$ of the "beat" wave on coupled helices, such as shown in Figs. 1 or 2, as a function of the phase constant $\beta$ of a wave on the inner helix when separate from other elements for various ratios of inner to outer helix radii.

Referring now in particular to the drawings, Fig. 1 is an illustrative embodiment of a traveling wave tube 10 having a helical wire transmission circuit 11. This helix is adapted so that a high frequency signal applied to the circuit at the gun end of the tube propagates along the circuit being amplified in its course by interaction with the electron stream 12 which passes through the center of the transmission helix. At the collector end of the tube the amplified signal is then extracted by an appropriate output circuit. External helices 13 and 14 are wrapped concentrically around helix 11 so that they may extract wave energy from the circuit and thus attenuate the signal voltage in the region near them. They are conveniently, but not necessarily, wrapped upon glass or quartz envelope 15 so that they may readily be moved along the axis of the tube. One end of each helix is formed into a pancake spiral substantially as shown so that resistance material 16 may be inserted in the space between or including the spirals.

The winding sense of helix 13 or helix 14 depends upon the amount of coupling desired; winding in a direction opposite to that of the winding of helix 11, produces greater coupling between inner and outer helices than produced by winding in the same sense. The outer helices should each have a turn pitch that makes the axial phase velocity of a wave propagating along each when it is separated from the inner helix approximately the same as the axial phase velocity on the inner helix. Since the axial phase velocity depends upon the length of conductor per unit of axial length, the phase velocities of the inner and outer helices when separated will be approximately the same when the turn pitches (angular pitches of conductor turns with respect to the axis of the helix) are the same. The ratio of inner to outer helix radii for a given frequency should be determined from Fig. 3 or Equation 6 herein, and when so chosen the attenuation introduced into tube 10 by helix 13 or helix 14 will be substantially constant over a wide range of frequency.

As a signal wave travels down helix 11 it induces on helix 13 or helix 14 a standing wave of voltage. For a wave traveling in the increasing z direction, which for convenience is taken from left to right, this voltage, which will appear on helix 13, may be written $$V_2 = e^{j\omega t} e^{-\Gamma z} \quad (1)$$

where $\Gamma$ is the propagation constant. Assuming that the axial phase velocity along each helix separate from the other is the same, that the attenuation is zero, and that $$\frac{X_{12}^2}{X_1 X_2} = x^2 \ll 1; \quad \frac{B_{12}^2}{B_1 B_2} = b^2 \ll 1 \quad (2)$$

where $X_1$ and $X_2$ are the series reactance per unit length, $B_1$ and $B_2$ are the shunt susceptance per unit length of the inner and outer helices respectively, and $X_{12}$ and $B_{12}$ are the mutual reactance and suspectance respectively between the helices, $V_2$ can be written $$V_2 = e^{j\omega t} \sin\left[\frac{\beta}{2}(x+b)z\right] e^{-j\beta\left(1+\frac{xb}{2}\right)z} \quad (3)$$

where $\beta$, the phase constant of a wave on the inner helix, equals $\sqrt{B_1 X_1}$. Thus the wave resulting from coupling two helices propagates with a velocity only slightly different from that of the wave on an uncoupled helix, but its amplitude varies sinusoidally, with distance, exhibiting a phenomenon which may be called "spatial beating." The "beat" phase constant is $$\beta_b = \frac{\beta}{2}(x+b)$$

and the beat wavelength is $$\lambda_b = \frac{2\lambda}{x+b}$$

where $\lambda$ is the wavelength on a single helix separated from other elements.

In the arrangement shown in Fig. 1, for a forward traveling wave on helix 11 the first voltage node of the induced voltage occurs at the left or gun end of helix 13. Proceeding along this helix to the right or collector end thereof, the voltage increases until at $\lambda_b/4$ it reaches a maximum value. At this point a termination, such as resistance 16, equal in value to the image impedance of helix 13 and helix 14, is placed so that maximum energy dissipation is obtained. Assuming complete transfer of power between coupled helices, which is very nearly the case, it is not necessary to terminate the collector end of helix 14 where there might otherwise be present an antinode of voltage induced by a forward traveling wave since any forward wave will be absorbed in resistance 16 before it can act on helix 14. In the case of a backward traveling wave on helix 11, the roles of helices 13 and 14 are reversed. By moving these helices along their axis relative to helix 11, the tube can readily be converted from low-level, high-gain to high-level, high-gain operation.

It can be shown that the radius $a_2$ of an outer coupled helix such as helix 13 is related to the radius $a_1$ of an inner helix, such as helix 11, by the following equation $$(\beta_b a_1) = (\beta a_1) e^{-\beta(a_2 - a_1)} \quad (4)$$

where $$\beta_b = \frac{2\pi}{\lambda_b}; \quad \beta = \frac{2\pi}{\lambda}; \quad \lambda_b$$

is the beat wavelength, $\lambda$ is the signal wavelength. While this equation is not exact it is nearly exact assuming that the coupling between helices is not too great, that the axial phase velocity of wave propagation along each helix separated from the other is the same and is much less than the speed of light and that the region between helices is free space. A more exact equation can be shown to be as follows:

$$(\beta_b a_1) = (\beta a_1) \left[ \frac{K_0(\beta a_2) I_0(\beta a_1)}{K_0(\beta a_1) I_0(\beta a_2)} \right]^{1/2} \quad (5)$$

where $I_0$ and $K_0$ are modified Bessel functions of zero order of the first and second kinds respectively. (See Chapter 3 of "Fields and Waves in Modern Radio" by Ramo and Whinnery, John Wiley Company, 1946). By differentiating either of these equations with respect to $(\beta a_1)$ and setting the result equal to zero, an approximate equation can be determined for the optimum ratio of $a_1/a_2$ at which the beat wavelength $\lambda_b$ will vary the least amount over a given range of frequency. The equation derived in this manner from Equation 4 is as follows:

$$\frac{a_1}{a_2} = \frac{1}{\left(\frac{1}{\beta a_1}\right)+1} \quad (6)$$

The derivation of Equation 4 and Equation 5 is not necessary to an understanding of the present invention and will not be given herein. However, physical reasoning substantiating their validity is as follows: given energy coupled helices such as are shown in Fig. 1, as the wavelength of the signal propagating along the wave transmission helix is decreased, the beat wavelength of the signal induced on an outer helix decreases. This decrease is not linear, however, because the beat wavelength is also a function of the inverse of the coupling between helices which is in turn inversely proportional to the frequency. Accordingly, although the beat wavelength is a function of the inverse of frequency it is also a function of frequency. At some frequency therefore, for a given structure, the beat wavelength is substantially unchanged by incremental changes in the operating wavelength. Expressing this another way, for a given frequency of operation there exists a particular ratio of helix radii for which the beat wavelength is substantially unchanged by incremental changes in frequency.

Fig. 2 shows a second illustrative embodiment of the invention in which a traveling wave tube 20, has surrounding its wave transmission helix 21 a coupled helix 22 and an output coupling helix 25. The ends of helix 22 are separated in length from each other by $\lambda_b/4$, as are the ends of helix 25. Terminations 23 and 24, which are connected to the ends of helix 22, are similar in purpose to termination 16 and have a value such that each is non-reflecting of wave energy.

The action of these coupled helices 22 and 25 is similar to that of helices 13 and 14 in Fig. 1. Like helices 13 and 14 of Fig. 1 and as shown in Fig. 2, helices 22 and 25 may be wound in a direction opposite to that of the winding of the wave transmission helix 21 in order to produce greater coupling between them and the transmission helix. A wave traveling in either direction along helix 21 will be substantially eliminated in the region surrounded by helix 22. A wave traveling in the forward direction at the collector end of helix 21 will transfer its energy to helix 25 where it is conveniently extracted by an appropriate output line 27, connected as shown. Any reflected wave energy returning at the collector end toward the gun end of the tube will be absorbed by non-reflecting termination 26 which is connected to the left end of helix 25. By making the diameter and pitch of helix 22 and helix 25 according to the formulas given above a very broad frequency band width can be obtained.

Fig. 3 shows several curves of the beat wave phase constant $\beta_b$ of a coupled helix, such as helix 13 or helix 14, as a function of phase constant $\beta$ of a concentrically aligned wave transmission helix, such as helix 11, for various ratios of inner helix radius $a_1$ to outer helix radius $a_2$. For a given value of the product $(\beta a_1)$ there is a ratio of inner to outer radii which results in minimum variation of $(\beta_b a_1)$ over the frequency band width. Thus for a value of $(\beta a_1)$ equal to one, the optimum ratio of $a_1$ to $a_2$ is approximately one-half. The curves of Fig. 3 are computed from Equation 5 which was derived for the case where the region between coupled helices is free space. In the event that a material, such as glass or quartz, is inserted between them, the actual optimum ratio of $a_1/a_2$ may be slightly different than the computed optimum value depending on the kind and amount of the material which is inserted.

The foregoing description is intended to be in illustration and not in limitation of the present invention. It should be noted in particular that instead of the single wire helices illustrated in the above embodiments, bifilar or multiwire helices can be utilized if desired. Other changes or modifications will occur to those skilled in the art and may be made without department from the spirit or scope of this invention.

What is claimed is:

1. In combination, a wave propagating helix, means for applying a signal of wavelength $\lambda$ to said propagating helix, and an energy coupled helix coaxially aligned with said propagating helix which when separated from said propagating helix has an axial wave phase velocity substantially equal that of said propagating helix, the helix radii being related substantially by the following equation:

$$\frac{a_1}{a_2} = \frac{1}{\frac{1}{\beta a_1}+1}$$

where $$\beta = \frac{2\pi}{\lambda}$$

$a_2$ is the radius of the outer helix and $a_1$ is the radius of the inner helix, whereby, for a given frequency of operation, the beat wavelength $\lambda_b$ of the signal induced on the coupled helix is substantially independent of the applied signal wavelength $\lambda$ over a maximum frequency band width.

2. The combination of elements as in claim 1 in which the inner helix is the wave propagating helix.

3. The combination of elements as in claim 1 in which the inner helix is the wave propagating helix and the outer coupled helix has a non-reflecting termination connected to it.

4. The combination of elements as in claim 1 in which one end of said coupled helix is connected to a non-reflecting termination, and the other end is connected to energy transmission means.

5. In a traveling wave tube, a first wave transmission helix having a radius $a_1$ and having when separated from other elements a wave propagation constant $\beta$, a member of dielectric material surrounding said helix, and a second helix surrounding said member and axially aligned with said first helix, said second helix having when separated from other elements a wave propagation constant $\beta$ and having a radius $a_2$ such that the ratio $a_1/a_2$ of inner to outer helix radii substantially satisfies the equation:

$$\frac{a_1}{a_2} = \frac{1}{\frac{1}{(\beta a_1)}+1}$$

6. The combination of elements as in claim 5 in which said second helix has a length equal to one-quarter the beat wavelength of the standing voltage induced thereon, and has connected to one end thereof a non-reflecting termination.

7. The combination of elements as in claim 5 in which a non-reflecting termination is connected to one end of said second helix and a wave transmission circuit is connected to the other end thereof.

8. A traveling wave amplifier having means including an electron gun and a collector electrode for forming an electron stream, a wave transmission circuit comprising a first conductor in the form of a helix having a given axial wave phase velocity positioned in the path of said stream, a second conductor in the form of a helix having an axial wave phase velocity approximately the same as the wave phase velocity of said first-mentioned helix, said second-mentioned helix being located in the path of said stream, concentric with and surrounding said first-mentioned helix for a portion only of the length thereof between said gun and said collector, and a termination which is non-reflecting of wave energy connected to said second-mentioned helix at a point thereon axially spaced from the ends of said first-mentioned helix.

9. In combination, a wave propagating helix, means for applying a signal of wavelength $\lambda$ to said propagating helix, and an energy coupled helix coaxially aligned with said propagating helix, the two said helices having individually the same wave phase velocity, and the helix radii being related substantially according to the following equation:

$$\frac{a_1}{a_2} = \frac{1}{\frac{1}{\beta a_1}+1}$$

where $$\beta = \frac{2\pi}{\lambda}$$

$a_2$ is the radius of the outer helix and $a_1$ is the radius of the inner helix, whereby, for a given frequency of operation, the beat wavelength $\lambda_b$ of the signal induced on the coupled helix is substantially independent of the applied signal wavelength $\lambda$ over a maximum frequency band width.

10. In a traveling wave tube having an electron gun and a collector electrode, a helix wave transmission circuit, a concentric surrounding helix which has a turn pitch substantially the same as that of said helix wave circuit, said surrounding helix being concentric with said first-mentioned helix for a portion only of the length thereof between said gun and collector electrode, and a termination which is non-reflecting of wave energy and which is connected to said surrounding helix at substantially a voltage maximum and at a point thereon axially spaced from the ends of said first-mentioned helix.

11. In combination, a wave propagating helix, means for applying a signal of wavelength $\lambda$ to said propagating helix, and an energy coupled helix coaxially aligned with said propagating helix and having a turn pitch substantially the same as that of said wave propagating helix, the helix radii being related substantially according to the following equation:

$$\frac{a_1}{a_2} = \frac{1}{\frac{1}{\beta a_1}+1}$$

where $$\beta = \frac{2\pi}{\lambda}$$

$a_2$ is the radius of the outer helix and $a_1$ is the radius of the inner helix, whereby, for a given frequency of operation, the beat wavelength $\lambda_b$ of the signal induced on the coupled helix is substantially independent of the applied signal wavelength $\lambda$ over a maximum frequency band width.

12. In a traveling wave tube, a first wave transmission helix having a radius $a_1$ and having at the frequency of operation a wave propagation constant $\beta$, a member of dielectric material surrounding said helix, and a second helix surrounding said member and axially aligned with said first helix, said second helix having a turn pitch substantially the same as that of said wave transmission helix and having a radius $a_2$ such that the ratio $a_1/a_2$ of inner to outer helix radii substantially satisfies the equation:

$$\frac{a_1}{a_2} = \frac{1}{\frac{1}{(\beta a_1)}+1}$$

13. In a radio frequency amplifying device, means forming an electron stream, a wave transmission circuit for propagating electromagnetic waves in field coupling relation with said stream comprising a first helical conductor positioned in the path of said stream, input means for introducing wave energy into one portion of said first helical conductor and output means for removing wave energy from another portion of the first helical conductor, a second helical conductor coaxial with a portion of said first helical conductor intermediate of the said portions where the input and output means are located, and means including resistive terminations at the two ends of the second helical conductor for making it substantially reflectionless, the ends of said second helical conductor being axially spaced from the corresponding ends of said first helical conductor.

14. A device according to claim 13 in which the said first and second helical conductors are wound in opposite sense.

15. A device according to claim 13 having a vacuum-tight envelope which encloses the said first helical conductor and of which the said second helical conductor is external to.

16. The combination according to claim 1 in which the said wave propagating helix and the said energy coupled helix are wound in opposite sense.

17. The combination according to claim 1 including also a vacuum-tight envelope which encloses the said wave propagating helix and of which the said energy coupled helix is external to.

18. In a radio frequency amplifying device, means forming an electron stream, a wave transmission circuit for propagating electromagnetic waves in field coupling relation with said stream comprising a first helical conductor positioned in the path of said stream, input means for introducing wave energy into one portion of said first helical conductor and output means comprising a second helical conductor coaxial with another portion of the said first helical conductor for removing wave energy therefrom, a third helical conductor coaxial with a portion of said first helical conductor intermediate of the said portions where the input and output means are located, and means including resistive terminations at the two ends of the third helical conductor for making it substantially reflectionless.

19. A device according to claim 18 in which the said first and second helical conductors are wound in opposite sense.

20. A device according to claim 18 having a vacuum-tight envelope which encloses the said first helical conductor and to which the said second and third helical conductors are external.

References Cited in the file of this patent

UNITED STATES PATENTS

| | | |
|---|---|---|
| 2,588,831 | Hansell | Mar. 11, 1952 |
| 2,588,832 | Hansell | Mar. 11, 1952 |
| 2,725,499 | Field | Nov. 29, 1955 |